July 7, 1942.　　　　E. C. OLIVER　　　　2,289,065
DRILL FOR RIFLE BARRELS
Filed Jan. 2, 1941
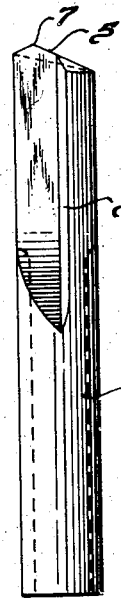
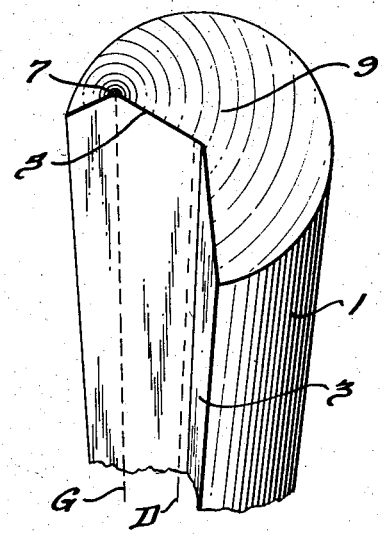
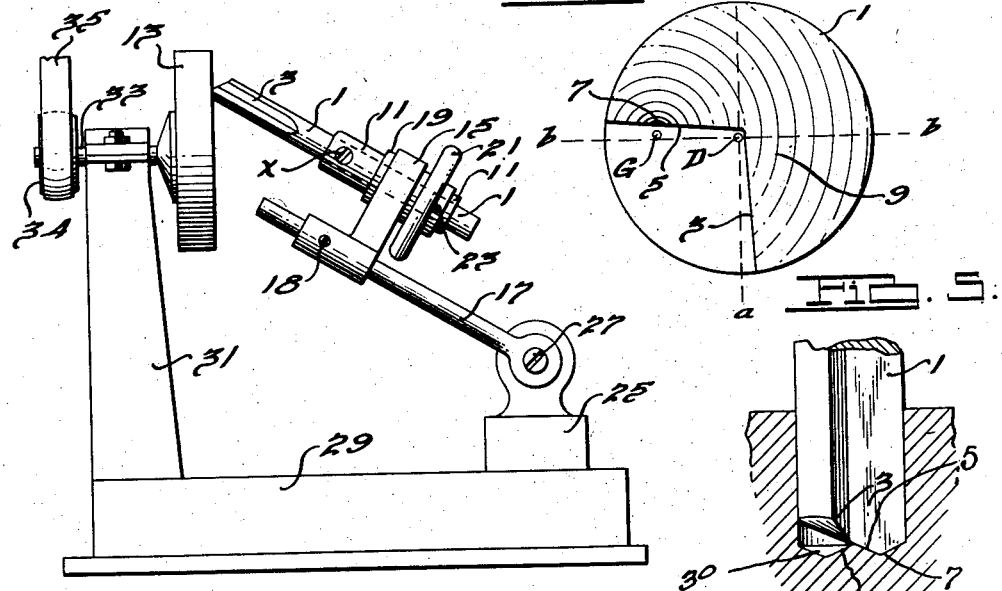
INVENTOR
Edd C. Oliver.
BY
ATTORNEY Patented July 7, 1942

2,289,065

UNITED STATES PATENT OFFICE 2,289,065

DRILL FOR RIFLE BARRELS

Edd C. Oliver, Adrian, Mich.

Application January 2, 1941, Serial No. 372,851

6 Claims. (Cl. 77—67)

My invention relates to an improved form of drill particularly adapted for use in drilling rifle barrels.

It is an object of my invention to provide an improved rifle or gun barrel drill an improved form of point having superior cutting characteristics and durability, and which is economical to manufacture and to grind to proper form.

It is also an object of my invention to provide an improved drill comprising a substantially cylindrical body of suitable metal having a flute extending axially along one side and opening through the cutting end which has a conical point so positioned that the apex and axis of the cone are eccentric with reference to the axis of the drill body and disposed in the space of the flute sufficiently near one side thereof that said side of the flute forms a cutting edge with the adjacent conical surfaces inclining at a suitable angle of clearance.

It is a further object of my invention to provide an improved method of grinding or making gun or rifle barrel drills which consists in pressing the point of an axially fluted drill body against a rotating flat face grinding wheel and rotating the drill body about an axis lying in the axial flute and eccentric to the normal axis of rotation of the drill body in such a manner as to form a conical point on the end of the drill body with the apex and axis of the cone eccentric to the main axis of the drill body and located in the open space of the axial flute sufficiently near one side of the flute so that the edge on that side of the flute forms a cutting edge of a length greater than the radius of the drill.

These and other objects and features of the invention are hereinafter more fully described and claimed and the preferred form of a drill embodying my invention is shown in the accompanying drawing in which—

Fig. 1 is a side elevation of my improved rifle barrel drill.

Fig. 2 is an enlarged perspective view showing the shape of the pointed end of my improved drill.

Fig. 3 is a plan view of the sharpened end of the drill, being partially diagrammatic, for showing more clearly the location of the normal axis of rotation for drilling and the grinding axis for rotating the drill to form the point.

Fig. 4 is a side elevational view of a convenient form of grinding apparatus for forming the cutting end of the drill.

Fig. 5 is an elevational view showing the form of the cut made by the drill point.

Referring more specifically to Figs. 1, 2 and 3 of the drawing, my improved rifle barrel drill comprises a drill body 1 of a suitable metal cutting material. The drill body is of a cylindrical conformation having a chip removing flute or groove 3 of V form extending axially of the drill on one side and opening through the pointed end of the drill. The flute is of a length greater than the depth of hole to be drilled to permit discharge of chips. The shank may also be of less diameter than the drill body as suggested by dotted lines in Fig. 1.

As may be seen in Fig. 3, the flute 3 extends into the circular cross-section of the drill a short distance beyond the axis of rotation D.

The cutting end of the drill body is so formed that the cutting edge or lip 5 extends from the outer periphery of the body into a point beyond the central axis of rotation D providing a cutting edge of a length greater than the radius of the cutting end of the drill. The cutting lip or edge 5 has a raised point 7 and the surface 9 of the ground end of the drill is of a conical conformation inclining from the high point of the cutting edge thus providing a suitable clearance angle.

In forming or sharpening the drill, apparatus shown in Fig. 4 may be utilized. The end of the drill body may be formed to provide such a cutting edge 5 having a high point 7 by mounting the drill body eccentrically in a rotatable holding member 11 adjacent a grinding wheel 13 having a flat grinding face. The drill holding member 11 is rotatably journalled in a bearing 15 which in turn is slidably mounted upon a stationary guide rod 17 secured in adjusted position by a screw 18. Mounted in this manner the drill 1 may be rotated while the end thereof is held against the flat face of the rotating grinding wheel 13. A flange 19 on the drill holder 11 engages one side of the bearing 15. On the other end of the holder 11 extending through the bearing 15, a hand wheel 21 is secured as by a screw 23 for abutting the other side of the bearing to secure the holder from longitudinal movement therein while providing convenient means for rotating the holder and the drill. However any suitable means may be provided for supporting and/or rotating the drill holder, as will be readily understood. The drill body is secured in the holder 11 as by means of a set screw x.

As may be understood from Fig. 4, the drill body 1 is supported in an aperture passing through the drill holder member 11 in eccentric relation to the axis of rotation of the holder in the bearing 15. The eccentricity of the drill holder 11 in bearing 15 is such that the longitudinal axis of the drill body 1 is from the axis of rotation of the drill holder by the distance D—G, which is the distance from the axis D of the drill to the grinding axis G. This determines the position of the high point 7 in the cutting edge 5 of the drill. The distance D—G may be varied and for this purpose a number of different drill holders 11 may be provided having the drill holding aperture disposed to provide various different eccentricities.

For securing the guide rod 17 and the grinding wheel 13 rigidly in suitable predetermined relative positions, the guide rod 17 is mounted upon a bracket 25 where it may be rigidly secured at any desired angle of inclination by a screw 27 passing therethrough. The bracket 25 rises from the bed 29 which also supports an upstanding bearing bracket 31 wherein a shaft 33 is for driving the grinding wheel 13 secured on one end of the shaft in the usual manner. The other end of the shaft may have a pulley 34 keyed thereon to be driven by a belt 35 from any suitable motive means.

In operation, a drill holder 11 is selected having suitable eccentricity and inserted in the bearing 15. The drill body having the flute 3, which may be either a new drill to be formed or an old drill to be sharpened, is inserted and secured in the drill holder. The bearing 15 is then slidably adjusted upon the guide rod 17 to engage the end of the drill body against the flat grinding face of the rotating grinding wheel 13, at a suitable angle of inclination. The drill body is then caused to rotate about the grinding axis G which lies in the flute adjacent one side thereof. This operation forms a conical surface on the end of the drill but the actual apex of the cone is not formed because the apex and axis of the cone is adjacent the cutting edge 5 in the open groove or flute 3 as shown in Fig. 3. The cutting edge formed by the means described has a raised point 7 at the point nearest adjacent the grinding axis of rotation G. The adjacent conical surfaces on the end of the drill are inclined away from the cutting edge with a suitable angle of clearance. In Fig. 1, the dotted line represents the remote edge of the conical surface on the end of the drill.

By forming the side of the flute having the cutting edge 5 at one side of the point G of the cone surface as shown in Fig. 3, a high point 7 thereof is provided that is of short radius due to the cutting edge 5 passing through the cone at one side of its high point G rather than coming to a V-shaped point in the cutting edge as would be the case had the cutting edge 7 passed exactly through the high point G. The high point of the cutting edge 7 therefore is not a sharp point but is slightly rounded for a short radius as will be seen in the enlarged view Fig. 2.

By the form of the drill point described, the material cut away in the drilling operation is in the form of a circle having a V shape as indicated at 30 in Fig. 5 and leaving a central cone 31 about which the cutting edge or lip 5 of the drill rotates and it will there be noted that the inner edge of the cutting lip 5 at the bottom of the flute extends beyond the point of the cone 31. Thus, the drill due to its cutting lip being of greater length than the radius of the drill body cuts the material to beyond the axis of rotation of the drill. In usual drills where the cutting lip is of a length not greater than the radius of the drill body, the material at the axis of rotation of the drill requires to be crushed by the pressure applied to the drill during the drilling operation. In my improved form of drill point, therefore, the cutting speed of the drill is increased.

It is apparent that within the scope of the invention, modifications and different arrangements may be made other than herein disclosed, and the present disclosure is illustrative merely, the invention comprehending variations thereof.

Having thus fully described my invention, its utility and mode of operation, what I claim and desire to secure by Letters Patent of the United States is:

1. A drill comprising a cylindrical body, a flute of V-form opening through one end thereof, the apex of which is at a distance from the surface of the body greater than the radius of the body, the end of the body being of cone-like form, the apex of which is within the flute adjacent the cutting edge.

2. A drill comprising a cylindrical body having a flute of substantially V-form opening through one end thereof and the apex of which is parallel with the longitudinal axis of the body, the said end being of a cone-like form, the apex of which is within the flute adjacent the side thereof having the cutting edge and providing a cutting edge of a V-form with an apex of a short radius.

3. A drill comprising a cylindrical body having a flute of substantially V-form opening through one end thereof and the apex of which is parallel with the longitudinal axis of the body and at a distance from the periphery of the drill greater than the radius of the body, the end of the body being of cone-like form, the apex of which is within the flute.

4. A drill comprising a substantially cylindrical body, a flute in the surface of the drill lying parallel with the longitudinal axis of the body, the end of the body being of a cone-like form, the apex of which is within the flute adjacent the cutting edge and providing a cutting edge of a V-form with an apex of a short radius.

5. A drill comprising a cylindrical body having a flute of V-form opening through one end thereof, the apex of which is at a distance from the surface of the body less than the radius of the body and providing a cutting edge greater in length than the radius of the body, the end of the body being of conical form with the high point at one side of the longitudinal axis of the body and to the rear of a radial line of the body passing through the axis of the cone.

6. The method of forming a drill of the character described which comprises the formation of a flute of V-form in the surface of the body parallel with the longitudinal axis thereof and then shaping the end of the body through which the flute opens in the form of a cone by rotation of the said end in contact with a flat grinding surface at an angle thereto about a point within the flute adjacent the cutting edge.

EDD C. OLIVER.